US010040489B2

(12) United States Patent
Baudry et al.

(10) Patent No.: US 10,040,489 B2
(45) Date of Patent: Aug. 7, 2018

(54) ALTERNATIVE EXTERIOR TRIM PART

(71) Applicant: AUTONEUM MANAGEMENT AG, Winterthur (CH)

(72) Inventors: Fabien Baudry, Stuttgart (DE); Wenzel Krause, Winterthur (CH); Luca Marotta, Winterthur (CH); Christopher Noakes, Richterswil (CH)

(73) Assignee: Autoneum Management AG, Winterthur (CH)

(*) Notice: Subject to any disclaimer, the term of this patent is extended or adjusted under 35 U.S.C. 154(b) by 37 days.

(21) Appl. No.: 15/306,268

(22) PCT Filed: Apr. 17, 2015

(86) PCT No.: PCT/EP2015/058358

§ 371 (c)(1),
(2) Date: Oct. 24, 2016

(87) PCT Pub. No.: WO2015/165752

PCT Pub. Date: Nov. 5, 2015

(65) Prior Publication Data

US 2017/0050682 A1 Feb. 23, 2017

(30) Foreign Application Priority Data

Apr. 29, 2014 (EP) .................................... 14166483

(51) Int. Cl.
*B62D 39/00* (2006.01)
*B62D 29/04* (2006.01)
(Continued)

(52) U.S. Cl.
CPC ............ *B62D 29/041* (2013.01); *B32B 3/266* (2013.01); *B32B 5/028* (2013.01); *B32B 5/26* (2013.01);
(Continued)

(58) Field of Classification Search
CPC ........ B62D 9/041; B62D 35/02; B32B 3/266; B32B 5/028; B32B 5/26; B32B 27/12;
(Continued)

(56) References Cited

U.S. PATENT DOCUMENTS 3,008,214 A 11/1961 Foster et al.
4,130,175 A 12/1978 Hehmann
(Continued)

FOREIGN PATENT DOCUMENTS

DE 1949209 4/1971
DE 9404621 7/1994
(Continued)

OTHER PUBLICATIONS

International Search Report and Written Opinion prepared by the European Patent Office dated Jun. 9, 2015, for International Application No. PCT/EP2015/058358.
(Continued)

*Primary Examiner* — Lori L Lyjak
(74) *Attorney, Agent, or Firm* — Lewis Brisbois Bisgaard & Smith LLP

(57) ABSTRACT

An exterior trim part for a vehicle comprises a fibrous porous structural layer. The fibrous porous structural layer consists of staple fibers, only. At least 50%, preferably between 70% and 100%, of the staple fibers comprise a first polymer made of modified polyester, such as CoPET, with a melting temperature between 150° C. and 240° C., preferably between 190° C. and 240° C.

20 Claims, 2 Drawing Sheets

7
8

(51) Int. Cl.

| | |
|---|---|
| ***B60R 13/08*** | (2006.01) |
| ***B32B 5/02*** | (2006.01) |
| ***B32B 5/26*** | (2006.01) |
| ***B32B 27/12*** | (2006.01) |
| ***B32B 27/40*** | (2006.01) |
| ***B32B 3/26*** | (2006.01) |
| ***D04H 1/435*** | (2012.01) |
| ***D04H 1/55*** | (2012.01) |
| ***B60K 11/06*** | (2006.01) |
| ***B62D 35/02*** | (2006.01) |
| ***D01F 8/14*** | (2006.01) |
| ***D04H 1/4382*** | (2012.01) |

(52) U.S. Cl.

CPC .............. *B32B 27/12* (2013.01); *B32B 27/40* (2013.01); *B60K 11/06* (2013.01); *B60R 13/0861* (2013.01); *B62D 35/02* (2013.01); *D01F 8/14* (2013.01); *D04H 1/435* (2013.01); *D04H 1/4382* (2013.01); *D04H 1/55* (2013.01); *B32B 2250/24* (2013.01); *B32B 2262/0276* (2013.01); *B32B 2262/0284* (2013.01); *B32B 2307/308* (2013.01); *B32B 2307/724* (2013.01); *B32B 2605/003* (2013.01); *B32B 2605/08* (2013.01); *D10B 2505/12* (2013.01)

(58) Field of Classification Search

CPC ................ B32B 27/40; B32B 2250/24; B32B 2262/0276; B32B 2262/0284; B32B 2307/308; B32B 2307/724; B32B 2605/003; B32B 2605/08; B60K 11/06; B60R 13/0861; D01F 8/14; D04H 1/435; D04H 1/4382; D04H 1/55; D10B 2505/12

See application file for complete search history.

(56) References Cited

U.S. PATENT DOCUMENTS

| | | | |
|---|---|---|---|
| 4,242,398 | A | 12/1980 | Segawa et al. |
| 4,435,015 | A | 3/1984 | Trotman et al. |
| 5,298,694 | A | 3/1994 | Thompson et al. |
| 5,387,382 | A | 2/1995 | Foettinger et al. |
| 5,493,081 | A | 2/1996 | Manigold |
| 5,509,247 | A | 4/1996 | Fortez et al. |
| 5,536,556 | A | 7/1996 | Juriga |
| 5,584,950 | A | 12/1996 | Gaffigan |
| 5,744,763 | A | 4/1998 | Iwasa et al. |
| 5,824,973 | A | 10/1998 | Haines et al. |
| 5,892,187 | A | 4/1999 | Patrick |
| 5,922,265 | A | 7/1999 | Parekh |
| 6,123,171 | A | 9/2000 | McNett et al. |
| 6,145,617 | A | 11/2000 | Alts |
| 6,177,180 | B1 | 1/2001 | Bodine et al. |
| 6,183,838 | B1 | 2/2001 | Kannankeril |
| 6,290,022 | B1 | 9/2001 | Wolf et al. |
| 6,631,785 | B2 | 10/2003 | Khambete et al. |
| 6,712,179 | B2 | 3/2004 | Bouyonnet |
| 6,955,845 | B1 | 10/2005 | Poole et al. |
| 7,318,498 | B2 | 1/2008 | Woodman et al. |
| 7,322,440 | B2 | 1/2008 | Kahn |
| 7,677,358 | B2 | 3/2010 | Tocchi et al. |
| 8,256,572 | B2 | 9/2012 | Castagnetti |
| 8,545,965 | B2 | 10/2013 | Buska |
| 8,636,105 | B2 | 1/2014 | Castagnetti |
| 2003/0062738 | A1 | 4/2003 | Fujii et al. |
| 2004/0075290 | A1 | 4/2004 | Campbell |
| 2004/0131836 | A1 | 7/2004 | Thompson |
| 2005/0016793 | A1 | 1/2005 | O'Regan et al. |
| 2006/0113146 | A1 | 6/2006 | Khan et al. |
| 2007/0272482 | A1 | 11/2007 | Yamaguchi et al. |
| 2008/0073146 | A1 | 3/2008 | Thompson, Jr. et al. |
| 2009/0085378 | A1 | 4/2009 | Borchardt et al. |
| 2010/0065368 | A1 | 3/2010 | Tazian |
| 2010/0078927 | A1 | 4/2010 | Takeuchi |
| 2010/0230206 | A1 | 9/2010 | Tinianov et al. |
| 2013/0316102 | A1 | 11/2013 | Yoshida |

FOREIGN PATENT DOCUMENTS

| | | |
|---|---|---|
| DE | 4429627 | 2/1996 |
| EP | 0079253 | 5/1983 |
| EP | 0384420 | 8/1990 |
| EP | 0454949 | 11/1991 |
| EP | 0514616 | 11/1992 |
| EP | 1428656 | 6/2004 |
| EP | 1491327 | 12/2004 |
| EP | 2159786 | 3/2010 |
| EP | 2 502 788 A1 | 9/2012 |
| FR | 2908550 | 5/2008 |
| JP | 2001-310672 | 11/2001 |
| JP | 2001-347899 | 12/2001 |
| WO | WO 98/18656 | 5/1998 |
| WO | WO 99/35007 | 7/1999 |
| WO | WO 00/23269 A1 | 4/2000 |
| WO | WO 00/39201 A2 | 7/2000 |
| WO | WO 02/094616 | 11/2002 |
| WO | WO 03018291 | 3/2003 |
| WO | WO 03/078714 A2 | 9/2003 |
| WO | WO 2006/007275 | 1/2006 |
| WO | WO 2011/032908 A1 | 3/2011 |
| WO | WO 2012/126763 A2 | 9/2012 |

OTHER PUBLICATIONS

Non-final office action from related U.S. Appl. No. 15/306,234, dated Jan. 29, 2018.

International Search Report and Written Opinion prepared by the European Patent Office dated May 18, 2015 for International Application No. PCT/EP2015/058357.

Hyundai i30 1.6 CRDI IL Prezzo Della Qualita, Quattroruote, 2008, Retrieved from http://www.quattroruote.it/prove/il-prezzo-della-qualita-hyundai-i30-16_crdi, 2 pages.

Hyundai i30, Kia Cee'd und VW Golf Wertkampf, Auto Motor-Sport, 2007, retrieved from http://www.auto-motor-und-sport.de/vergleichstest/hyundai-i30-kia-cee-d-und-vw-golf-wertkampf, 11 pages.

Report on mechanical properties of porous materials, Materiacustica, 3, 2012, 6 pages.

Bertolini et al., "Transfer function based method to identify frequency dependent Young-Modulus, Poisson-Ratio and Loss-Factor of poro-elastic materials," Rieter Automotive Management AG, 2007; 5 pages.

Brouard et al., "A general method for modelling sound propagation in layered media," Journal of Sound and Vibration, 1995, vol. 193(1), pp. 129-142, abstract only, 1 page.

Danilov et al., "On the limits of an 'in vacuum' model to determine the mechanical parameters of isotropic poroelastic materials," Journal of Sound and Vibration, 2004, vol. 276(3-5), 26 pages.

Hankook Pelzer Ltd., "Isolation Pad Assembly Dash Panel," 2007, 5 pages.

Hankook Pelzer Ltd., Invoice to Hyundai Motor Manufacturing Czech s.r.o., 2008, 3 pages.

Langlois et al., "Polynomial relations for quasi-static mechanical characterization of isotropic poroelastic materials," J. Acoustical Soc. Am., 2001, vol. 110(6), pp. 3032-3040.

Notice of Opposition opposing European Patent No. EP 2365483, Jan. 4, 2013, 29 pages.

Shim et al., Hyundai and Kia Engineering Standard—Material Specification—Dash Isolation Pad—Multi Absorption Type, 2004, 10 pages.

International Preliminary Report on Patentability for International (PCT) Patent Application No. PCT/EP2015/058357, dated Nov. 10, 2016, 9 pages.

Extended European Search Report dated Aug. 25, 2010, regarding European Application No. 10155905.2, 5 pages.

(56) References Cited

OTHER PUBLICATIONS

Extended European Search Report dated Sep. 1, 2010, regarding European Application No. 10155903.7, 6 pages.
International Search Report for International (PCT) Patent Application No. PCT/EP2006/005861, dated Nov. 14, 2006, 3 pages.
Written Opinion for International (PCT) Patent Application No. PCT/EP2006/005861, dated Nov. 14, 2006, 8 pages.
International Search Report for International (PCT) Patent Application No. PCT/EP2003/013870, dated Apr. 6, 2004, 7 pages.
Notice of Allowance for U.S. Appl. No. 13/043,748, dated May 3, 2012, 7 pages.
Official Action for U.S. Appl. No. 13/565,497, dated Jan. 18, 2013, 10 pages.
Final Action for U.S. Appl. No. 13/565,497, dated Jul. 10, 2013, 5 pages.
Notice of Allowance for U.S. Appl. No. 13/565,497, dated Sep. 19, 2013, 8 pages.
Official Action for U.S. Appl. No. 11/917,385, dated Dec. 4, 2012, 9 pages.
Notice of Allowance for U.S. Appl. No. 11/917,385, dated Jul. 3, 2013, 9 pages.
Official Action for U.S. Appl. No. 10/538,494, dated Dec. 19, 2006, 9 pages.
Notice of Allowance for U.S. Appl. No. 10/538,494, dated Sep. 11, 2007, 5 pages.

ALTERNATIVE EXTERIOR TRIM PART

CROSS REFERENCE TO RELATED APPLICATIONS

This application is a national stage application under 35 U.S.C. 371 and claims the benefit of PCT Application No. PCT/EP2015/058358 having an international filing date of 17 Apr. 2015, which designated the United States, which PCT application claimed the benefit of European Patent Application No. 14166483.9 filed 29 Apr. 2014, the disclosure of each of which are incorporated herein by reference.

TECHNICAL FIELD

The invention is directed to a trim part for a vehicle. The trim part is in particularly suited for use on the exterior lower region of the car, in particularly as a cladding under the car, in the area of the engine as under engine shield or under the main area as an underbody trim part.

In the last decade the car industry started covering the car side facing the road with cladding or so called trim parts. The reduction of road noise coming from the tires on the road as well as optimising the aerodynamics of the region under the car are partly the reasons for doing so.

Many of these trim parts are formed or moulded to a 3-dimensional shape to follow the geometry of the body section they are intended to cover. Often, 3-dimensional moulds and heat energy are used to shape the trim part. These type of trim parts—underbody trim parts and/or under engine shields—are 3-dimensional structural parts that need to keep their structure when mounted under the car, without showing a predefined level of sagging during use. Depending on the car type, these parts must be able to span a larger distance or area without unacceptable sagging. Furthermore these parts should be able to function in a harsh environment over the entire life of the car, for instance they are subjected to stone chipping, hot, cold and/or wet weather conditions and might also collide with road obstacles during use. In addition the part close to the power train is exposed to high temperatures.

Many of these parts are made as injection moulded plastic parts, sometimes between the plastic carrier and the vehicle floor covered with a sound absorbing material to enhance acoustic performance. These parts are overall heavy. The trend is to go for lighter parts to reduce the overall weight of the car and therefore the fuel consumption.

There are underbody trim parts on the market made of a porous core layer, whereby the core layer contains glass fibres bound by a thermoplastic binder. As thermoplastic binder polypropylene, polyester or a resinous type are used. The structural stiffness is essentially coming from the use of glass fibres. Glass fibres are less popular in recent years as exposure to the fibres during the production of the parts as well as the assembly of the parts in the car, can pose a health issue for the people handling the material.

The parts currently on the market are heavy in general, or the material used causes other problems.

There is a need for alternative materials and for lighter versions of such trim parts which however are able to withstand the same conditions and are having an acoustic function.

SUMMARY OF INVENTION

This is achieved by the respective teaching of the independent claims. Advantageous developments constitute the subject matter of the dependent claims.

In accordance with a first aspect of the invention, an exterior trim part for a vehicle comprises a fibrous porous structural layer. The fibrous porous structural layer consists of staple fibres, only. At least 50%, preferably between 70% and 100%, of the staple fibres comprise a first polymer made of modified polyester, such as CoPET, with a melting temperature between 150° C. and 240° C., preferably between 190° C. and 240° C.

By furnishing the exterior trim part with the above staple fibres only, the number of connections between the staple fibres per unit volume is increased thus improving the structural stability of the exterior trim part. This may lead to an increased bending stiffness and less sagging of the exterior trim part. This serves to solve the underlying object.

By furnishing the exterior trim part with the above staple fibres only, the thermal stability of the exterior trim part is improved which permits its use near hotter parts of the vehicle, such as near the engine or near the exhaust, in particular because of the specified melting temperature of the first polymer. This serves to solve the underlying object.

DEFINITIONS

Within the scope of the present invention, bending stiffness is understood as a property of a body to be bent, indicating the body's curvature when a bending torque is imposed. Bending stiffness [N·mm$^2$] is calculated as the body's material's elastic modulus E·the second moment of area I of the body's cross section about the bending axis. Alternatively, bending stiffness may be determined experimentally by a method according to DIN 53362.

Within the scope of the present invention the melting temperature of a polymer such as polyurethane or polyester is the least temperature [° C.] at or above which the polymer runs through a transition from a crystalline or semi-crystalline phase to a solid amorphous phase. The melting temperature of polymers shall be measured using Differential Scanning calorimetry (DSC) according to ISO 11357-3.

Within the scope of the present invention the AFR or airflow resistance, that is the exterior trim part's resistance to an airflow through the above main plane P, is measured with an "Airflow Resistance Measurement System" or CARE+ system commercially available from Autoneum Management AG. Alternatively, the AFR is measured according to DIN EN 29053 or DIN 9053 method A.

Within the scope of the present invention, an exterior trim part is understood as a part serving to cover a section of the vehicle body, which may be connected to the vehicle body, in particular to the vehicle's underbody—the side of the vehicle that is facing the road. The underbody trim part can be formed as one part or as many parts together covering the surface of the underbody. Further within the scope of the present invention an exterior trim part can also mean a trim part that covers a part under the engine bay area, in particularly as an under engine shield. However the exterior trim part can also cover other areas of the exterior of the car that is subject to the same or similar conditions.

Within the scope of the present invention, the fibrous porous structural layer is to be understood as a layer largely contributing to the mechanical stability of the exterior trim part. The bending stiffness of the exterior trim part is determined largely by the fibrous porous structural layer. Its cross-section is designed to avoid unacceptable sagging of the exterior trim part when held at or near its edges in an essentially horizontal plane. The fibrous porous structural layer consists of staple fibres, only.

Within the scope of the present invention, staple fibres are mono- or bicomponent fibres, preferably with a round or contoured or trilobal cross section. The staple fibres form a fibrous web within the fibrous porous structural layer. They are usually made by a melt spinning process, whereby the material is molten, extruded, passed through a spin pack to obtain the desired cross section and cooled. Preferably, the process includes drawing steps or crimping steps. A resulting filament is cut into staple fibres of a predefined length. When a fibres mixture is used, the fibres are mixed before forming the fibrous layer. Staple fibres are cut after production and baled for later use. Before cutting, staple fibres may be crimped for easier processing. Using additional process steps as known by the skilled person, for instance via carding-cross lapping or air laid processes a fibrous mat may be formed. This mat can be used to further produce the product according to the current invention.

Within the scope of the present invention bicomponent staple fibres may be formed of two polymers combined to form fibres having a core of one polymer and a surrounding sheath of the other polymer. In particular, the bicomponent fibres may be arranged in a sheath-core, side-by-side, islands-in-the-sea, or segmented-pie arrangement. In addition the fibres can have different cross-section, preferably the fibres used have a round, or contoured or trilobal cross-section. The production of bicomponent fibres is known in the art, see for instance the Fibre Table according to P.-A. Koch (2008, Shaker Verlag, ISBN 978-38322-7037-7). The first polymer has a melting temperature according to DSC lower than the melting temperature according to DSC of the second polymer so that upon heating of the bicomponent fibres, the first and second polymers react differently. For example, when the bicomponent fibres are heated to a temperature that is above the softening or melting temperature according to DSC of the first polymer (the sheath polymer) and below the melting temperature according to DSC of the second polymer (the core polymer), the first polymer will soften or melt while the second polymer doesn't. This softening of the first polymer will cause the first polymer to become sticky and bond to staple fibres that may be in close proximity. The core polymer stays intact and forms a network of staple fibres in the final product.

Within the scope of the present invention the first polymer is understood to support or enable the material connection of at least two of the staple fibres of the fibrous porous structural layer by softening at an increased temperature as specified. The first polymer is a modified polyester, wherein small amounts of additional monomers are used during polymerisation to reduce the melting temperature according to DSC in comparison to an unmodified polyester. Preferably, a CoPET is used as the first polyester.

Within the scope of the present invention a CoPET is understood as a modified polyethylene terephthalate, where small amounts of additional monomers are used during polymerisation to reduce the melting temperature according to DSC in comparison to some other members of the polyester family. Commonly used additional monomers are diethylene glycol or iso-phthalic acid.

Within the scope of the present invention the second polymer is understood to provide improved integrity and stability of the staple fibres. To this end the melting temperature of the second polymer is greater than the melting temperature of the first polymer. Preferably, a polyethylene terephthalate (PET) is used as the second polymer.

Within the scope of the present invention PET (polyethylene terephthalate) is understood as a member of the polyester family of polymers. Polyester is a family of polymers which contain ester functional groups in their main chain. Polyesters are generally prepared by the reaction of dicarboxylic acids with glycols. PET is essentially prepared using terephthalic acid and monoethylene glycol.

The Fibrous Porous Structural Layer

Each of the following preferred developments may be advantageously combined with one or several of other of the preferred developments, unless stated otherwise.

Each of the following preferred fibre mixtures contains at least 10% (preferably more than 15%, more preferably 20%) by weight of the overall composition of CoPET such that CoPET is abundant available for the binding of the PET fibres or core that stays intact and that there are multiple binding points between the PET fibres or core. The preferred fibre mixtures may offer therefore the advantage of a better stiffness and mechanical stability.

According to a preferred development, the first polymer forms sheaths of at least 50%, preferably between 70% and 100%, of the staple fibres. The staple fibres of this preferred development each comprise a core which is surrounded by the sheath. The sheath forms the outer surface of the staple fibre. A material connection of two of these staple fibres is such that their sheaths are materially connected. This preferred development may offer the advantage that the first polymer is easily accessible during the connection of two of these staple fibres.

According to a preferred development, at least 50%, preferably between 70% and 100%, of the staple fibres comprise a second polymer made of PET with a melting temperature of at least 240° C., preferably wherein the second polymer forms cores of said staple fibres. This preferred development may offer the advantage that the second polymer may improve the integrity and stability of the staple fibres in particular after their bonding to form the fibrous porous structural layer.

According to a preferred development, up to 50% of the staple fibres consist of PET with a melting temperature of at least 240° C. These PET staple fibres are mixed with the CoPET staple fibres before their connection to form the fibrous porous structural layer. This preferred development may offer the advantage that the recycling of the exterior trim part may be improved. This preferred development may offer the advantage that the material connection of the PET staple fibres may be improved. This preferred development may offer the advantage of an improved mechanical stability of the exterior trim part.

According to a preferred development, the fibrous porous structural layer comprises at least 50%, preferably between 70 and 100%, first bicomponent staple fibres, the sheaths of which consist of the first polymer and their cores consist of the second polymer. Preferably, all staple fibres are bicomponent staple fibres. This preferred development may offer the advantage of an improved recyclability. This preferred development may offer the advantage of an improved mechanical stability. This preferred development may offer the advantage of material connection of the staple fibres within the fibrous porous structural layer.

According to a preferred development, at least 10%, preferably between 20% and 60%, of the staple fibres comprising the first polymer, consist of the first polymer. This preferred development may offer the advantage of an improved recyclability. This preferred development may offer the advantage of an improved mechanical stability. This preferred development may offer the advantage of material connection of the staple fibres within the fibrous porous structural layer.

According to a preferred development, some, preferably the rest, of the staple fibres of the fibrous porous structural layer consist of the second polymer or are said first bicomponent staple fibres. Preferably, the mixture of staple fibres comprises more than 50%, more preferably more than 70%, of the first bicomponent staple fibres and the rest are PET staple fibres. This preferred development may offer the advantage of an improved recyclability. This preferred development may offer the advantage of an improved mechanical stability. This preferred development may offer the advantage of material connection of the staple fibres within the fibrous porous structural layer.

According to a preferred development, at least 15%, preferably 20% to 40% of the staple fibre mixture of the fibrous porous structural layer are solid CoPET staple fibres and the rest are PET staple fibres. This preferred development may offer the advantage of an improved recyclability. This preferred development may offer the advantage of an improved mechanical stability. This preferred development may offer the advantage of material connection of the staple fibres within the fibrous porous structural layer.

According to a preferred development, at least 5%, preferably 10% to 30% of the staple fibre mixture of the fibrous porous structural layer are solid CoPET staple fibres and the rest are first bicomponent staple fibres, as explained previously. This preferred development may offer the advantage of an improved recyclability. This preferred development may offer the advantage of an improved mechanical stability. This preferred development may offer the advantage of material connection of the staple fibres within the fibrous porous structural layer.

According to a preferred development, the fibrous porous structural layer comprises a) said first bicomponent staple fibres, with a sheath of the first polymer and with a core of the second polymer, and b) second bicomponent staple fibres, the sheaths of which with a melting temperature of at least 20° C. lower than the melting temperature of the sheaths of the first bicomponent staple fibres, wherein the first and second bicomponent staple fibres form at least 15%, preferably between 20% to 40%, of the fibrous porous structural layer. Thus, the sheath polymer of the first bicomponent staple fibres is different from the sheath polymer of the second bicomponent staple fibres. Preferably, staple fibres consisting of the second polymer form the rest of the staple fibres of the fibrous porous structural layer. This preferred development may offer the advantage of an improved recyclability. This preferred development may offer the advantage of an improved mechanical stability. This preferred development may offer the advantage of material connection of the staple fibres within the fibrous porous structural layer.

According to a preferred development, the fibrous porous structural layer comprises between 10% to 40% by weight of the first polymer. This preferred development may offer the advantage of an improved recyclability. This preferred development may offer the advantage of an improved mechanical stability. This preferred development may offer the advantage of material connection of the staple fibres within the fibrous porous structural layer.

According to a second aspect of the invention, an exterior trim part for a vehicle comprises a fibrous porous structural layer, wherein the fibrous porous structural layer, consists of staple fibres, wherein at least 15%, preferably between 20% and 40%, of the staple fibres consist of a first polymer made of modified polyester, such as CoPET, with a melting temperature between 150° C. and 240° C., preferably between 190° C. and 240° C., wherein the rest of the staple fibres of the fibrous porous structural layer consist of a second polymer made of PET with a melting temperature of at least 240° C.

By furnishing the exterior trim part with the above staple fibres only, the number of connections between the staple fibres per unit volume is increased thus improving the structural stability of the exterior trim part. This may lead to an increased bending stiffness and less sagging of the exterior trim part. This serves to solve the underlying object.

By furnishing the exterior trim part with the above staple fibres only, the thermal stability of the exterior trim part is improved which permits its use near hotter parts of the vehicle, such as near the engine or near the exhaust, in particular because of the specified melting temperature of the first polymer. This serves to solve the underlying object.

In case the used bicomponent fibre is of the core-sheath type, the first named polymer is the core (sheath), the second the sheath (core) polymer.

Preferably, the fibrous porous structural layer according to the invention is made of a combination of PET and CoPET, whereby the Copolyester (CoPET) used has a melting temperature according to DSC of at least 190° C. and preferably the polyester used has a melting temperature of at least 240° C.

The PET and CoPET can be combined in one fibre as a bicomponent fibre, or can be a mixture of PET and CoPET monocomponent fibres. Also, there can be a mixture PET monocomponent fibres and bicomponent fibres with CoPET.

Preferably, the fibrous porous structural layer:

1. consists of bicomponent staple fibres with of a CoPET sheath with a melting temperature of at least 150° C., preferably at least 170° C., preferably at least 190° C., and with a PET core with a melting temperature of at least 240° C., or
2. comprises first bicomponent staple fibres with a CoPET sheath with a melting temperature of at least 150° C., preferably at least 170° C., preferably at least 190° C., and with a PET core with a melting temperature of at least 240° C., or
3. according to No. 2 further comprises second bicomponent staple fibres consisting of a CoPET sheath with a melting temperature of at least 20° C. lower than the melting temperature of the sheath of the first bicomponent staple fibres, or
4. according to No. 2 or No. 3 further comprises PET staple fibres with a melting temperature of at least 240° C. and/or CoPET staple fibres, or
5. comprises a mixture of staple fibres with CoPET staple fibres with a melting temperature of at least 150° C., preferably at least 170° C., preferably at least 190° C., and with PET staple fibres with a melting temperature of at least 240° C.

"Sheath" of the above embodiments of the fibrous porous structural layer shall be understood as a first polymer of the staple fibres independent of the arrangement of at least two polymers within the staple fibres.

"Core" of the above embodiments of the fibrous porous structural layer shall be understood as a second polymer of the staple fibres independent of the arrangement of at least two polymers within the staple fibres.

Preferably, the fibrous porous structural layer:

1. consists of bicomponent staple fibres with of a CoPET first polymer with a melting temperature of at least 150° C., preferably at least 170° C., preferably at least 190° C., and with a PET second polymer with a melting temperature of at least 240° C., or 2. comprises first bicomponent staple fibres with a CoPET first polymer with a melting temperature of at least 150° C., preferably at least 170° C., preferably at least 190° C., and with a PET second polymer with a melting temperature of at least 240° C., or
3. according to No. 2 further comprises second bicomponent staple fibres consisting of a CoPET first polymer with a melting temperature of at least 20° C. lower than the melting temperature of the first polymer of the first bicomponent staple fibres, or
4. according to No. 2 or No. 3 further comprises PET staple fibres with a melting temperature of at least 240° C. and/or CoPET staple fibres, or
5. comprises a mixture of staple fibres with CoPET staple fibres with a melting temperature of at least 150° C., preferably at least 170° C., preferably at least 190° C., and with PET staple fibres with a melting temperature of at least 240° C.

Preferably, the bicomponent staple fibres are formed in a sheath-core arrangement in which the sheath is formed of a first polymer, which substantially surround the core formed of a second polymer. It is not required that the sheath polymer totally surround the core polymer.

Staple length, a property of staple fibres, is a term referring to the average length of a group of fibres of any composition. Preferably, some, most or all of the staple fibres have a staple length between 10 and 150 mm. Preferably, the staple fibre with the longest staple length is formed from the PET with the highest melting temperature.

Preferably, the staple fibres used have a diameter between 10 and 40 μm, more preferably between 18 and 30 μm.

Preferably, the percentage by weight of CoPET polymer in the mixture is between 5 and 50%, preferably between 20 and 35%. The CoPET polymer forms either separate staple fibres or the sheaths of staple fibres.

Preferably, the staple fibre mixture of variants 3 or 4, can comprise other fibres to form bulk, up to 20% of the total weight of the fibrous mixture. Preferably, this is polypropylene, cotton or polyamide staple fibres.

According to a preferred development, the sectional weight [g/m$^2$], hereinafter named "area weight" (AW), of the fibrous porous structural layer is between 500 and 2,500 g/m$^2$. The preferred development may offer the advantage that the weight of the exterior trim part is reduced.

According to a preferred development, the desired AFR of the fibrous porous structural layer is between 200 and 2,500 N·s/m$^3$, which may vary throughout the trim part. The preferred development may offer the advantage that the sound absorption of the exterior trim part is improved.

According to a preferred development, the desired thickness of the fibrous porous structural layer is between 1.5 and 10 mm, which may vary throughout the trim part. The preferred development may offer the advantage that the mechanical and/or acoustic properties are improved.

According to a preferred development, the fibrous porous structural layer has a bending stiffness (Young's modulus E·second moment of area I) of more than 15.000 N·mm$^2$, which may be determined by a method according to DIN 53362.

Preferably, the porous structural fibrous layer substantially does not contain glass fibres or other mineral fibres.

Thermoplastic Polyurethane Film

Within the scope of the present invention thermoplastic polyurethane (TPU) is understood as an elastomer, the essentially linear primary chains of which have segmented structures. Within the same primary chain "soft segments", which may stretch reversibly, alternate with "hard segments". The polarity of the hard segments creates a strong attraction between them, which causes a high degree of aggregation and order in this phase, forming crystalline or pseudo crystalline areas located in a soft and flexible matrix. The crystalline or pseudo crystalline areas act as physical cross-links. The TPU is understood not to be foamed. The thermoplastic polyurethane is preferably based on polyester or polyether. In contrast, thermoset polyurethane comprises covalent bonding between primary chains in the soft segments.

According to a preferred development, the exterior trim part comprises at least one perforated film layer, which is made of thermoplastic polyurethane with a melting temperature according to Differential Scanning calorimetry (DSC) of at least 140° C. and which is materially connected to said fibrous porous structural layer.

By choosing a TPU with a melting temperature according to DSC above 140° C. the film is melting enough during moulding to become sticky but not enough to form droplets and wick into the surrounding material.

According to a preferred development, the melting temperature according to DSC of the film layer is less than a melting temperature according to DSC of the fibrous porous structural layer. The preferred development may offer the advantage that the film layer still reduces the airflow rate through the exterior trim part after connecting the film layer and the fibrous porous structural layer. The preferred development may offer the advantage that the perforation of the film layer essentially remains air permeable after connecting the film layer and the fibrous porous structural layer.

Preferably, the melting temperature according to DSC of the thermoplastic polyurethane is greater than 150° C., more preferably greater than 160° C.

Preferably, the melting temperature of the TPU film is smaller than 230° C.

Unexpectedly, a thermoplastic polyurethane perforated film with a melting temperature according to DSC of at least 140° C. maintains essentially its two-dimensional shape as a film layer and therefore the perforations while melting enough to materially connect to the fibrous structural layer. Therefore the airflow resistance of the overall trim part can be anticipated.

With many of the film materials used so far, the material melts largely during the moulding process. The film disintegrates largely and is wicked into the surrounding fibres of the structural fibrous layer, therefore the integrity of the film layer is largely lost and the perforation is no longer effective in the final product. Although the final product will show an increased airflow resistance it will be patchy and unpredictable.

By combining the fibrous porous structural layer with the perforated film layer according to the present invention, the sound absorption of the exterior trim part is increased in comparison with the sound absorption of the fibrous porous structural layer by itself. Furthermore, the air flow resistance is more evenly spread over the trim part following the original pattern of perforation present on the film.

By combining the fibrous porous structural layer with the perforated film layer, the flow resistance [N·s/m$^3$] imposed on an airflow (airflow resistance or "AFR") through a main plane P, as explained in the following, is increased which may improve the exterior trim part's ability to absorb sound. It is assumed that the exterior trim part or its fibrous porous structural layer essentially extends in a 2-dimensional main plane P, at least prior to optional 3-dimensional forming of the exterior trim part in a mould, which is explained later.

Unexpectedly, the film layer is not disintegrating during the moulding process, instead remains largely intact. In addition the perforation does not have a negative impact on the film, for instance the perforation itself does not form the source of tearing during 3-dimensional moulding of the trim part. The preferred development may offer the advantage that the film layer remains essentially a film during the connection of the fibrous porous structural layer with the film layer.

Surprisingly, the elasticity of the TPU film in addition may prevent the film from cracking or tearing during the 3-dimensional moulding offering the advantage of an intact film layer that maintains its air flow resistance, albeit a small difference between the AFR of the film before and after moulding might be observed without diverting from the invention as anticipated.

According to a preferred development, the perforation of the film layer comprises, at least in sections, a perforation density of more than 150,000 holes/$m^2$, preferably more than 200,000 holes/$m^2$, preferably less than 750,000 holes/$m^2$. By increasing or decreasing the holes/$m^2$ the air flow resistance over the exterior trim part may be designed to reflect the AFR needed to obtain the sound absorption wanted.

According to a preferred development, the perforation of the film layer, at least in sections, comprises holes the cross sectional area of which corresponds to essentially cylindrical holes with a diameter between 10 and 1000 μm. The preferred development may offer the advantage that the sound absorption of the exterior trim part is improved.

According to a preferred development, the perforation of the film layer, i.e. its perforation density and size, is chosen such that the AFR of the exterior trim part is between 1,000 and 4,500 N·s/$m^3$, more preferably between 1,500 and 2,500 N·s/$m^3$. The preferred development may offer the advantage that the sound absorption of the exterior trim part is improved.

According to a preferred development, the thickness of the exterior trim part is in the range between 1.5 to 10 mm, at least in sections.

According to a preferred development, the film layer is not perforated but nevertheless air permeable, preferably within the moulded exterior trim part. This may offer the advantage, that the effect of the film layer to cover the fibrous porous structural layer against moisture or dirt is improved.

According to a preferred development, the film layer is only partially perforated, preferably within the moulded exterior trim part, thereby creating areas of no air permeability. This may offer an advantage in areas where the airflow through the part is interfering with the thermal management of the vehicle.

Additional Layers

According to a preferred development, the exterior trim part further comprises scrim layer which is, preferably materially, connected to the film layer. The film layer is arranged, at least in sections, between the scrim layer and the fibrous porous structural layer. The scrim layer is permeable to fluids such as air. The scrim layer does not significantly contribute to the AFR of the exterior trim part.

Preferably, the scrim layer consists of thermoplastic fibrous material. Preferably, the melting temperature according to DSC of the scrim layer's material is greater than the melting temperature according to DSC of the film layer's material. The area weight of the scrim layer can be between 15 and 250 g/$m^2$, preferably between 50 and 150 g/$m^2$.

Preferably, the scrim layer can be made from filaments or staple fibres or mixtures of staple fibres. Preferably, the fibres are made by meltblown or spunbond technology. These type of scrim layers are also known as nonwoven layers. Preferably, the material chosen is heat stable over long time thermal load exposure. Preferably, the scrim layer's fibres are made of polyester, or polyamide, or oxidised, thermally stabilised polyacrylonitrile (PAN, also known as PANox) or a combination of fibres for instance of polyester and cellulose, or polyamide and polyester. Preferably, the scrim layer can be treated with the usual treatment necessary for the area of appliance, like for instance oil repellency, water repellency, flammability treatment etc. A preferred example of a scrim layer can be a nonwoven scrim layer made of polyester fibres.

A preferred example of a scrim layer can be a nonwoven scrim layer made of the same or similar material as the fibrous structural layer.

It was found that the thermoplastic polyurethane of the film layer permits the lamination of a further layer, such as the scrim layer. A separate adhesive as well as the associated cost and effort can be avoided.

The preferred development may offer the advantage that the exterior trim part can be removed more easily from a mould after moulding.

According to a preferred development, the exterior trim part further comprises a heat reflective layer which is particularly materially connected to either the fibrous porous structural layer, the TPU film layer or the scrim layer. Preferably, the heat reflective layer covers only a section of the exterior trim part. Preferably, the heat reflective layer comprises a metal, more preferred aluminium or an aluminium alloy. Preferably, the heat reflective layer forms a further layer of the exterior trim part.

It was found that the thermoplastic polyurethane of the film layer permits the lamination of a further layer, such as the heat reflective layer, to the fibrous porous structural layer's material. A separate adhesive as well as the associated cost and effort can be avoided.

The preferred development may offer the advantage that the resistance of the exterior trim part to temperatures above 160° C., e.g. in an engine compartment of a vehicle or near its exhaust, is improved. The preferred development may offer the advantage that the exterior trim part may be used in an engine compartment of a vehicle or near its exhaust, for instance as an under engine shield.

The exterior trim part is manufactured with layering at least the fibrous porous layer, forming the fibrous porous structural layer after moulding, and the film layer, which is made of thermoplastic polyurethane with a melting temperature according to DSC of at least 140° C., in a mould. The layers are treated with heat (heat treatment), for instance with pressurised steam of a predetermined temperature, inside the mould such that the CoPET content of the fibrous layer softens and/or melts as well as the film layer. A force driving the layers towards each other is imposed, which may, where necessary, compress the fibrous material and form the 3-dimensional shape of the exterior trim part. The exterior trim part is cooled in the moulding tool and the layers materially connect to each other.

The heat treatment can be done by hot moulding or by preheating the materials with infrared heating or contact heating followed by moulding in preferably a hot tool.

It was found that by choosing thermoplastic polyurethane with the specified melting temperature according to DSC the essentially two-dimensional shape of the film layer is largely maintained and the perforation of the film layer essentially remains air permeable after connecting the film layer and the fibrous porous layer.

Unexpectedly, a thermoplastic polyurethane perforated film with a melting temperature according to DSC of at least 140° C. maintains essentially its two-dimensional shape as a film layer and therefore the perforations while melting enough to materially connect to the fibrous structural layer. Therefore the airflow resistance of the overall trim part can be anticipated.

Additional layers, such as the scrim layer or the heat reflective layer, can be added before closing the mould.

It was found that the thermoplastic polyurethane of the film layer permits the lamination of a further layer, such as the scrim layer or a heat reflective layer, by the softened fibrous porous structural layer's material even when the film layer separates the further layer from the fibrous porous structural layer. A separate adhesive as well as the associated cost and effort can be avoided.

According to a second aspect of the invention, the exterior trim part can be used as an engine bay covering panel, a top-, side- or undercover for an engine, an oil pan cover, an under engine shield, a fire wall, an at least partially covering outer dash panel, an air guiding panel behind the cooler of the engine bay or a vehicle's underbody covering panel, an outer wheel arch liner or as an automotive exterior trim part.

Preferably, the fibrous porous structural layer is positioned near, adjacent or in physical contact with the vehicle's underbody, while the perforated film layer faces the source of the noise. This may offer the advantage of an improved sound absorption.

Preferably, the exterior trim part can be used as a hush panel within the interior of the vehicle under the dash board and above the driver's feet. In this position the exterior trim part is exposed to dirt and moisture of the driver's or front passenger's feet. In this position the exterior trim part may be kicked by the driver's or front passenger's feet. In this position the exterior trim part may be sagging under its own weight. Therefore, the exterior trim part, when being used as a hush panel, may offer the advantages of improved long term stability or of improved absorption of sound in particular stemming from the engine. As the hush panel is close or against the area that is heated by the powertrain the panel can be also partly subjected to an increase temperature over long times. Therefore, the exterior trim part, when being used as a hush panel, may offer the advantages of improved long term thermal stability.

Preferably, the structural stiffness is due to the fibrous material of the porous fibrous structural layer. The stiffness may be enhanced by advantageous design feature of the 3 dimensional trim part for instance by incorporating carefully placed ribs of compressed areas. Preferably, the stiffness of the final part is not due to the use of glass or mineral fibres.

BRIEF DESCRIPTION OF DRAWINGS

Further advantages, features and applications of the present invention become apparent from the following description referring to the figures, showing.

FIG. 1*a* shows an exploded view of the exterior trim part 1 according to a preferred development. The thicknesses of the layers are not drawn to scale. The fibrous porous structural layer 2 is connected with the perforated film layer 3.

FIG. 1*b* shows a preferred development of the exterior trim part 1. The thicknesses of the layers are not drawn to scale. This exterior trim part 1 has a scrim layer 4. The film layer 3 is arranged between the fibrous porous structural layer 2 and the scrim layer 4. The scrim layer 4 is materially connected to the film layer 3. The scrim layer 4 serves to protect the film layer 3 and to simplify the removal of the exterior trim part 1 from a mould during manufacturing.

FIG. 1*c* shows a further preferred development of the exterior trim part 1. The thicknesses of the layers are not drawn to scale. This exterior trim part 1 has a heat reflective layer 6. The film layer 3 is arranged between the fibrous porous structural layer 2 and the heat reflective layer 6. The heat reflective layer 6 is materially connected to the film layer 3. The heat reflective layer 6 is designed with one or several patches 6*a*, 6*b* which are arranged to face hot parts of a vehicle, such as the exhaust.

FIG. 3 shows a drawing of the underside of a car. The exterior trim part according to the invention can be used for example as under engine shield 7 or as panelling under the main floor, also known as under-body panel 8. Preferably, the exterior trim part for instance the underbody panel 8 can be divided in more than one part to enable a better handling or optimise on transport.

REFERENCE SIGN LIST

Figure 1:
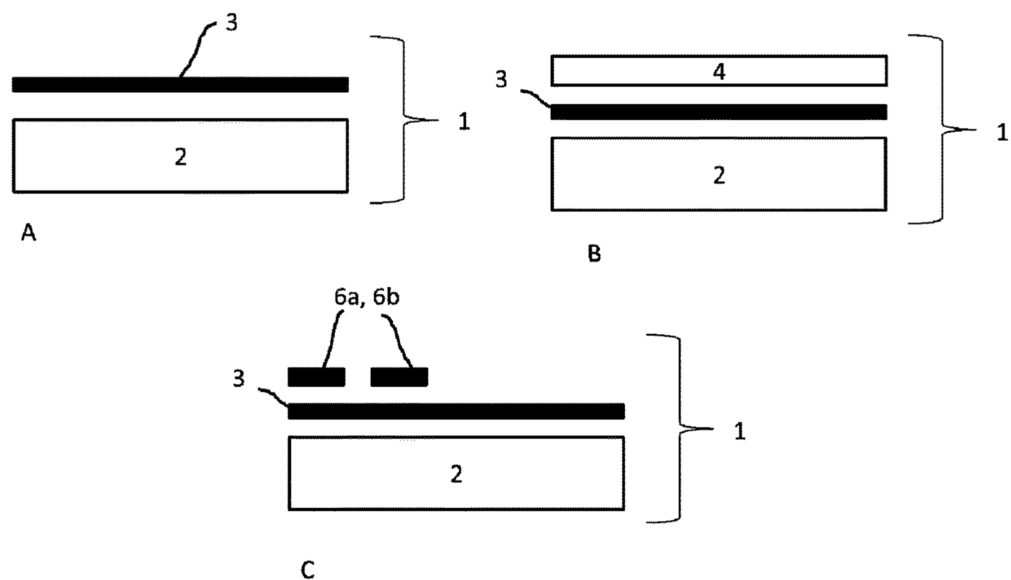
FIGS. 1*a* to 1*c* schematically show cross sections of preferred developments of the exterior trim part, FIG. 2 a plot of sound absorption.
Figure 2:
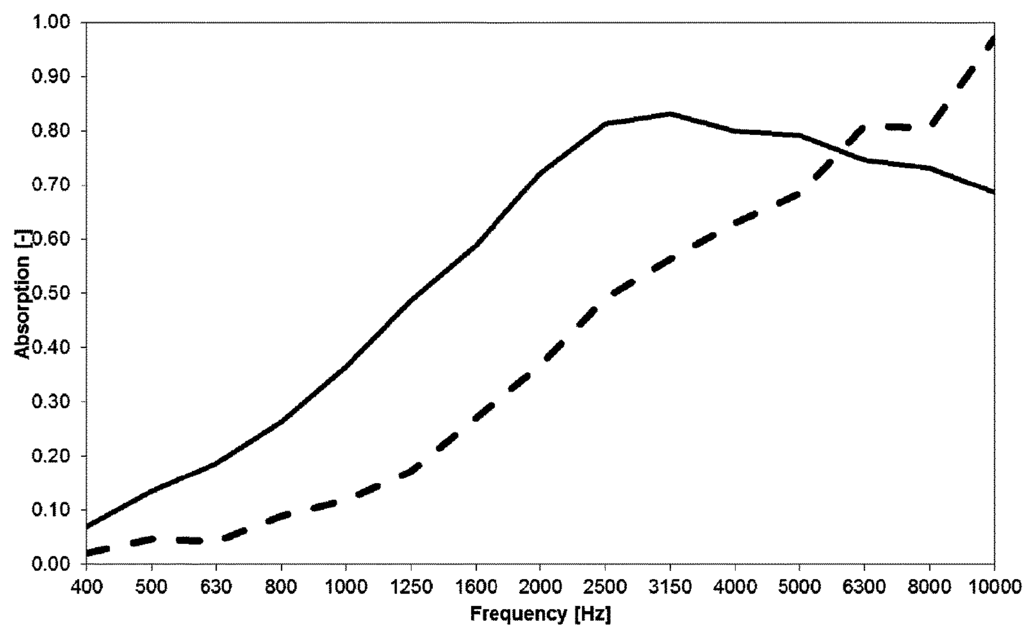
FIG. 2 shows a plot of sound absorption [–] depending on the frequency. The dashed line shows the fibrous porous structural material without the film layer (reference). The solid line shows the fibrous porous structural layer with the film according to the invention (invention). The average AFR of the reference was measured as 646 N·s/m$^3$. The average AFR of the invention was measured as 2,120 N·s/m$^3$. When measuring the sound absorption, the microphone was located on the film side of the exterior trim part. The fibrous porous layer of the tested specimens had a nominal area weight of 1,000 g/m$^2$ and the nominal thickness of the specimens was 4 mm. By using fibrous porous structural layer together with the film layer according to the invention the sound absorption was significantly improved within the range shown.
Figure 3:
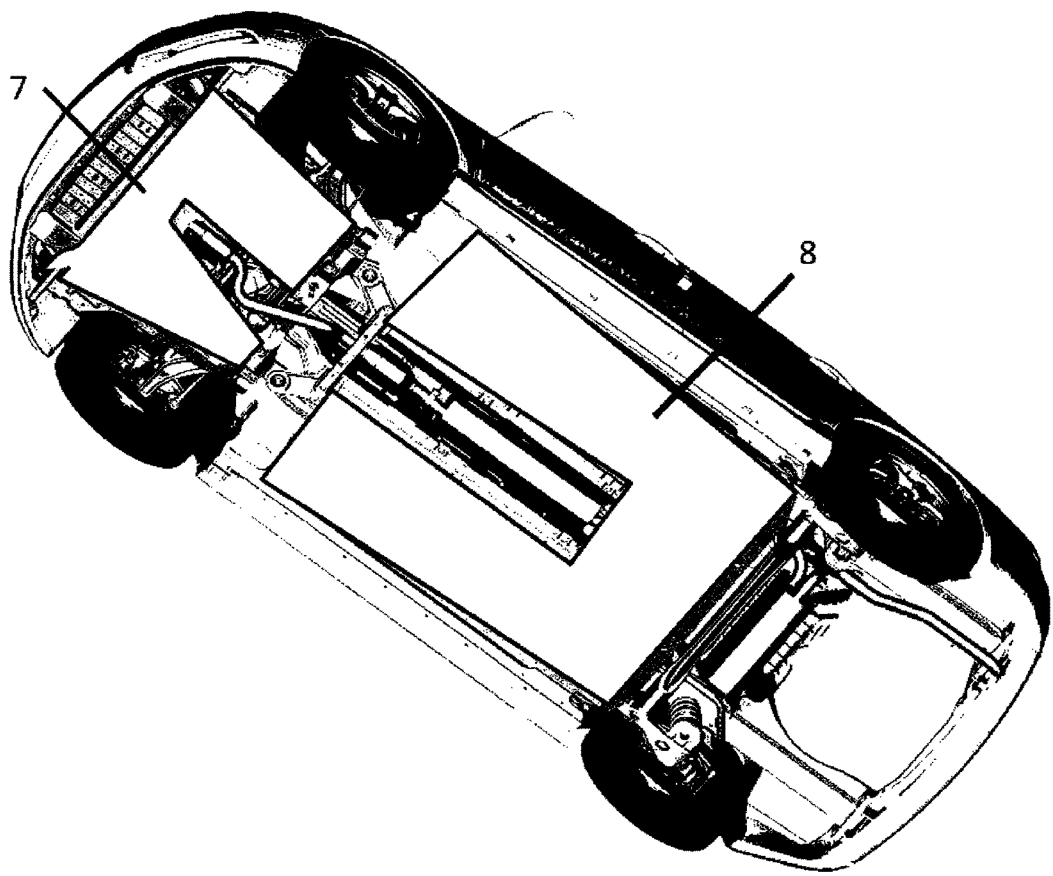
FIG. 3 shows a drawing of the underside of a car.

1 exterior trim part
2 fibrous porous structural layer
3 film layer
4 scrim layer
6 heat reflective layer
7 under engine shield
8 underbody panel

What is claimed is:

1. An exterior trim part for a vehicle, comprising:

a fibrous porous structural layer, wherein the fibrous porous structural layer consists of staple fibres, wherein at least 50%, preferably between 70% and 100%, of the staple fibres comprise a first polymer made of modified polyester, such as CoPET, with a melting temperature between 150° C. and 240° C., preferably between 190° C. and 240° C.; and at least one perforated film layer, which is made of non-foamed thermoplastic polyurethane with a melting temperature according to Differential Scanning calorimetry (DSC) of at least 140° C. and which is materially connected to the fibrous porous structural layer.

2. The exterior trim part according to claim 1, wherein the first polymer forms sheaths of at least 50%, preferably between 70% and 100%, of the staple fibres.

3. The exterior trim part according to claim 1, wherein at least 50%, preferably between 70% and 100%, of the staple fibres comprise a second polymer made of PET with a melting temperature of at least 240° C., preferably wherein the second polymer forms cores of the staple fibres.

4. The exterior trim part according to claim 1, wherein up to 50% of the staple fibres consist of PET with a melting temperature of at least 240° C.

5. The exterior trim part according to claim 1, wherein the fibrous porous structural layer comprises at least 50%, preferably between 70 and 100%, first bicomponent staple fibres, the sheaths of which consist of the first polymer and their cores consist of the second polymer.

6. The exterior trim part according to claim 1, wherein at least 10%, preferably between 20% and 60%, of the staple fibres comprising the first polymer consist of the first polymer.

7. The exterior trim part according to claim 5, wherein some, preferably the rest, of the staple fibres of the fibrous porous structural layer consist of the second polymer or are the first bicomponent staple fibres.

8. The exterior trim part according to claim 1, wherein the fibrous porous structural layer comprises a) the first bicomponent staple fibres, and b) second bicomponent staple fibres, the sheaths of which with a melting temperature of at least 20° C. lower than the melting temperature of the sheaths of the first bicomponent staple fibres, wherein the first and second bicomponent staple fibres form at least 15%, preferably between 20% to 40%, of the fibrous porous structural layer, and preferably staple fibres consisting of the second polymer.

9. An exterior trim part for a vehicle, comprising:

a fibrous porous structural layer, wherein the fibrous porous structural layer, consists of staple fibres, wherein at least 15%, preferably between 20% and 40%, of the staple fibres consist of a first polymer made of modified polyester, such as CoPET, with a melting temperature between 150° C. and 240° C., preferably between 190° C. and 240° C., wherein the rest of the staple fibres of the fibrous porous structural layer consist of a second polymer made of PET with a melting temperature of at least 240° C.; and comprising at least one perforated film layer, which is made of non-foamed thermoplastic polyurethane with a melting temperature according to Differential Scanning calorimetry (DSC) of at least 140° C. and which is materially connected to the fibrous porous structural layer.

10. The exterior trim part according to claim 1, wherein the thermoplastic polyurethane film is based on polyether or polyester.

11. The exterior trim part according to claim 1, wherein the exterior trim part has a total thickness between 1.5 and 10 mm and has an airflow resistance (AFR) in the direction of thickness between 1,000 to 4,500 N·s/m$^3$.

12. The exterior trim part according to claim 1, wherein the film is only partially perforated.

13. The exterior trim part according to claim 1, wherein the film layer is not perforated but air permeable.

14. The exterior trim part according to claim 1, with a scrim layer which is, in particular materially, connected to the film layer.

15. A method of using the exterior trim part according to claim 1 as an engine bay covering panel, a top for an engine, side for an engine, an undercover for an engine, an oil pan cover, an under engine shield, a fire wall, an at least partially covering outer dash panel, an air guiding panel behind the cooler of the engine bay or the vehicle's underbody covering panel, an outer wheel arch liner, a hush panel, or as an automotive exterior trim part.

16. The exterior trim part according to claim 1, a heat reflective layer interconnected to the fibrous porous structural layer or the at least one perforated film layer.

17. The exterior trim part according to claim 1, wherein the non-foamed thermoplastic polyurethane is elastomeric.

18. The exterior trim part according to claim 16, wherein the heat reflective layer is interconnected only to a portion of the fibrous porous structural layer or the at least one perforated film layer.

19. The exterior trim part according to claim 9, a heat reflective layer interconnected to the fibrous porous structural layer or the at least one perforated film layer.

20. The exterior trim part according to claim 19, wherein the heat reflective layer is interconnected only to a portion of the fibrous porous structural layer or the at least one perforated film layer.

* * * * *